Figure 1:
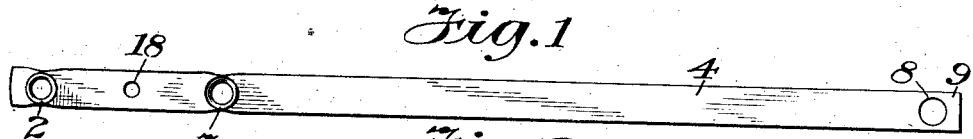

Aug. 7, 1928.

J. L. DINSMOOR

SEAL 1,679,467

Filed May 28, 1925

2 Sheets-Sheet 1

INVENTOR
John L. Dinsmoor
BY Wilbur M. Stone
HIS ATTORNEY

Aug. 7, 1928.

J. L. DINSMOOR 1,679,467

SEAL

Filed May 28, 1925

2 Sheets-Sheet 2

INVENTOR
John L. Dinsmoor
BY
Wilbur M. Stone
HIS ATTORNEY

Patented Aug. 7, 1928.

1,679,467

UNITED STATES PATENT OFFICE.

JOHN L. DINSMOOR, OF NEW YORK, N. Y.

SEAL.

Application filed May 28, 1925. Serial No. 33,382.

This invention relates to seals, particularly to that class thereof formed of ductile sheet metal and having telescoping and interlocking hollow studs or eyelets. The object of my improvements is to provide a seal of the class specified of simple construction, and which is adapted for effective interlocking with precision and ease.

With these ends in view and others which will appear later herein, my improvements comprise features illustrated in their preferred embodiment in the drawings accompanying this specification, wherein:—

Figure 2:
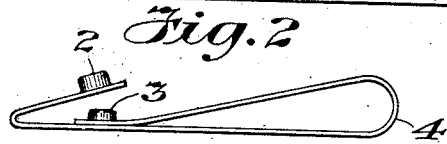
Figure 3:
Figure 4:
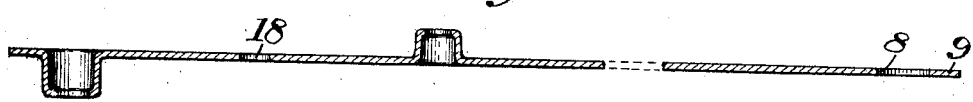
Figure 5:
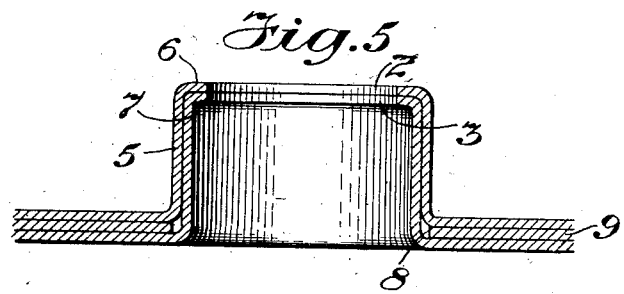
Figure 6:
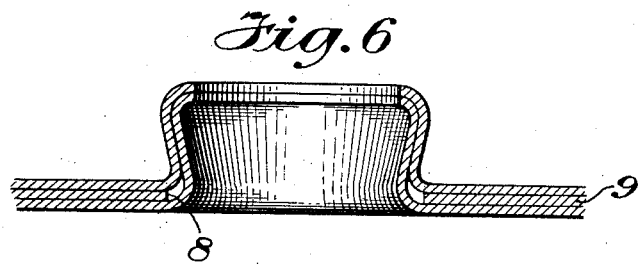
Figure 7:
Figure 8:
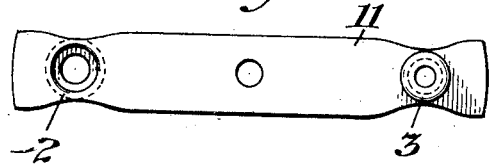
Figure 9:
Figure 10:
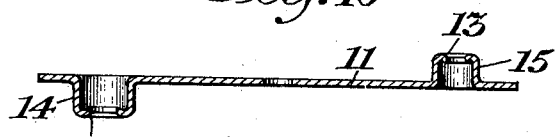
Figure 11:
Figure 12:
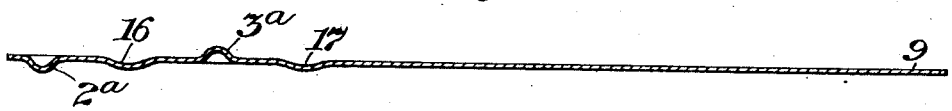
Figure 13:
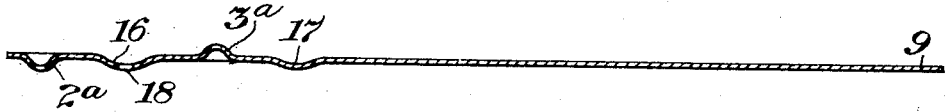
Figure 14:
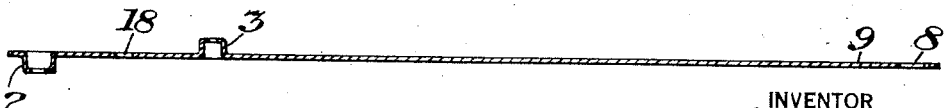

Figure 1 is a plan view of my improved seal. Fig. 2 is an edge view thereof assembled ready for setting. Fig. 3 is similar to Fig. 2 but showing the seal set. Fig. 4 is a longitudinal section of the seal. Figs. 5, 6 and 7 are step views, in section, illustrating the closing or setting of the seal. Figs. 8 and 9 are, respectively, a plan and lengthwise section of a modified form of seal embodying my improvements, and Fig. 10 is a section similar to that of Fig. 9, showing a slight modification of a detail of construction. Figs. 11, 12, 13 and 14 are lengthwise sections showing successive steps in the operation of forming my improved seal. The scale of Figs. 1, 2 and 3, and 11 to 14 inclusive, is the same and about actual size. The scale of Figs. 4, 8, 9 and 10 is equal and about twice that of Fig. 1, while the scale of Figs. 5, 6 and 7 is about eight times that of Fig. 1.

The present invention is in the nature of an improvement on the seal of Figs. 1, 2 and 3 of my copending application Ser. No. 511,139, filed October 29, 1921, to which reference may be had.

In the seal of said application the hollow studs thereof have heads, whereas the studs of the present application are without heads but have small inturned flanges, respectively. This is the principal difference between these two cases, and a highly important difference as will presently appear.

In drawing the metal to form the headed studs considerable difficulty is experienced, even with high grade, highly ductile metal, in attaining approximately parallel vertical walls, that is, an approximately cylindrical form. To attain walls nearly enough to the vertical to permit their outward flow in setting, requires several successive drawing operations, each one of which tends to harden the metal to the detriment of the setting operation, by making greater pressure necessary than would otherwise be required, and in addition the hardened metal does not flow and bend as easily as desired.

On the other hand if said studs are made entirely headless, such studs of eyelet character, can not be satisfactorily set by means of a flat jawed tool, but must be set by a tool having a protruding horn to enter the open upper end of the eyelet-like stud to cause the walls thereof to curl outwardly. Such protruding horn on the setting tool requires a greater amount of opening between the setting tool jaws than when flat faced jaws are used and which added opening is objectionable. Further, it requires greater care and more time on the part of the operator in applying a setting tool with a horn.

By the use of my present improvements it is possible to reduce the height of the studs materially from that required for the closed top type and still maintain an equal efficiency in sealing. This permits a reduced opening between the jaws of the setting tool and a consequent increased ratio of leverage with the same distance of handle movement of the tool, whereby increased leverage is obtained without increasing the distance apart of the handle members to be gripped within the hand. This decrease in the height of stud permits the use of a cheaper and less ductile metal for the seals, an important item in the cost of manufacture.

Referring now to the drawings, Figs. 1, 2 and 3 illustrate the method of folding and locking the seal and will be readily understood, particularly in view of subsequent description herein. In Figs. 4 and 5 the construction of the seal appears more fully, the larger stud 2, projecting near one end of strip 4, has its circular wall 5 as nearly cylindrical as may be and the outer end thereof is turned inwardly to form a flange 6, which is preferably substantially parallel with strip 4. The smaller stud 3, projecting from the opposite face of strip 4, is similar to stud 2 but has an outside diameter slightly less than the inside diameter of stud 2, so as to enter freely therein when assembling. Said stud 3 is provided with inwardly turned flange 7 at its outer end. The height of stud 3 is such that when assembled, as in Fig. 5, it will substantially fill stud 2 vertically. Near the other end 9 of strip 4, remote from studs 2 and 3 is opening 8, the wall of which is adapted to close over stud 3 when the seal is assembled in locking relation, Fig. 2.

Studs 2 and 3 are spaced apart on strip 4 a sufficient distance to permit that end of the strip having stud 2 therein to be folded over onto the other end 9 of the strip when the hole in that end is registered with stud 3, Fig. 2. Midway between studs 2 and 3 an opening 18 through strip 4 is provided to facilitate the bending of said strip at the proper place to cause studs 2 and 3 to register and telescope together.

In the modified form of Figs. 8 and 9 the strip 11 is only so long as to accommodate the two studs 2 and 3, which may be telescopically assembled and set.

In Fig. 10 the flanges 12, 13 of studs 14, 15, respectively, are curved upwardly and downwardly at their inner edges, respectively, toward the base of said studs, whereby a smooth surface is provided for the heads of the studs, so that the fingers of the hand may be drawn over them without danger.

The action and behavior of the walls of the studs when being crushed and set will be seen from Figs. 5, 6 and 7. Fig. 5 shows the three members, outer stud 2, apertured end 9 and smaller stud 3 assembled. Fig. 6 shows the studs partly collapsed as between a pair of jaws of a setting tool, not shown but of known character. It will be observed that the tendency of said studs is to flow outwardly near their upper ends and for the opening through the flanges to become enlarged slightly, and the tendency of the lower portion of said studs is to flow inwardly. In Fig. 7 the studs are shown collapsed to their full extent, the opening through the flanges and the lower inner walls having closed materially while the upper portions of the studs have flowed outwardly, thereby producing a broad and efficient lock.

In making seals of the character of those herein described, wherein the studs have a diameter greater than half the width of the strip, a considerable portion of the material from which the stud is formed is drawn from the lengthwise portion of the strip. For economic manufacture it is desirable to form the two studs at the same time, and that such formation may proceed without hindrance, a loop 16 is formed in said strip 4 between the prospective positions of said studs. This is the first step in the operation of making such seals as are shown in Figs. 8, 9 and 10. If the seal is to have an elongated end, such as 9 of Figs. 1 to 4 inclusive, then a second loop 17 is formed in the strip between the prospective location of the smaller stud and end 9 of the strip. This loop is of less prominence than loop 16 as it supplies material for one stud only whereas loop 16 supplies material for two studs. The next step in the operation is to press a domed stud $2^a$ in one direction, from said strip, between the left hand end of the strip, Fig. 12, and loop 16, and another domed stud $3^a$ in the opposite direction, from said strip, between loops 16 and 17. The forming of these relatively small domed studs does not take up material lengthwise the strip an appreciable amount, so loops 16 and 17 are not materially drawn upon. The next step in the operation is punching holes through said domed studs, see Fig. 13, and if desired, at the same time, hole 18 between studs $2^a$ and $3^a$. The final step is the drawing of said domed studs to their final cylindrical shape 2 and 3, Fig. 14, with inturned flanges and the punching of hole 8 near end 9 of said strip. This drawing of domed studs $2^a$ and $3^a$ into cylindrical studs takes up the provided slack of loops 16 and 17.

I claim:

1. A seal formed of a strip of flexible material including in combination two tubular studs formed from said strip, each of said studs having an inturned outer flange, an orifice near one end of said strip adapted to be entered by one of said studs, the other of said studs adapted to telescope over said first mentioned stud, said studs and orificed strip-end being adapted for interlocking by compression.

2. A seal formed of a strip of flexible material and provided with an orifice and with two tubular studs, at least one of said studs having an inturned outer flange, said strip being bendable at two points for the end portions to overlap and for said studs to telescopically fit one into the other, the inner stud being first passed through said orifice, and for the end portions of the strip to be locked together by upsetting the studs into mutually interlocking relation.

3. A seal formed of a strip of flexible material and provided near one end with an orifice, two tubular studs near the other end of said strip, an opening through said strip between said studs and equidistant from each thereof, said strip being bendable for that stud nearer said orifice to pass through said orifice and bendable across said opening between the studs to enable said studs to register and telescopically engage.

In witness whereof, I hereby affix my signature this 26 day of May, 1925.

JOHN L. DINSMOOR.